(12) United States Patent
Reuter et al.

(10) Patent No.: US 10,000,897 B2
(45) Date of Patent: Jun. 19, 2018

(54) DRIVING DEVICE IN A SELF-PROPELLED CONSTRUCTION MACHINE AND METHOD FOR SETTING A SPEED RATIO IN SUCH A DRIVING DEVICE

(71) Applicant: BOMAG GmbH, Boppard (DE)

(72) Inventors: Marco Reuter, Emmelshausen (DE); Rafael Schomaker, Lingen (DE); Manfred Hammes, Emmelshausen (DE)

(73) Assignee: BOMAG GmbH, Boppard (DE)

( * ) Notice: Subject to any disclaimer, the term of this patent is extended or adjusted under 35 U.S.C. 154(b) by 0 days. days.

(21) Appl. No.: 14/388,512

(22) PCT Filed: Mar. 8, 2013

(86) PCT No.: PCT/EP2013/000686
§ 371 (c)(1),
(2) Date: Sep. 26, 2014

(87) PCT Pub. No.: WO2013/143652
PCT Pub. Date: Oct. 3, 2013

(65) Prior Publication Data
US 2015/0091363 A1   Apr. 2, 2015

(30) Foreign Application Priority Data
Mar. 27, 2012   (DE) .................. 10 2012 006 189

(51) Int. Cl.
*E01C 23/08* (2006.01)
*E01C 23/088* (2006.01)
(Continued)

(52) U.S. Cl.
CPC ............. *E01C 23/088* (2013.01); *B60K 6/12* (2013.01); *B60K 6/36* (2013.01); *B60K 25/02* (2013.01);
(Continued)

(58) Field of Classification Search
CPC ............................. E01C 23/127; E01C 23/088
See application file for complete search history.

(56) References Cited

U.S. PATENT DOCUMENTS 4,325,580 A * 4/1982 Swisher, Jr. ........... B28D 1/186
299/39.8
2003/0162619 A1   8/2003 Rodeghiero et al.
(Continued)

FOREIGN PATENT DOCUMENTS

DE   10 2009 038 338 A1   2/2011
DE   10 2009 051 478 A1   5/2011
(Continued)

OTHER PUBLICATIONS

Espacenet, English Machine Translation of German Application No. DE102009038338A1, published Feb. 24, 2011, retrieved from http://worldwide.espacenet.com on Sep. 10, 2014 (12 pages).
(Continued)

*Primary Examiner* — John J Kreck
(74) *Attorney, Agent, or Firm* — Wood Herron & Evans LLC

(57) ABSTRACT

The present invention relates to a device in a self-propelled construction machine with a first driving unit, which provides for a first speed of rotation ($n_1$). By means of a planetary gear the first speed of rotation ($n_1$) is translated into a different speed of rotation ($n_3$) at which a working device of the construction machine, in particular a milling rotor for processing ground surfaces, can be operated.

8 Claims, 8 Drawing Sheets

(51) Int. Cl.
*B60K 25/02* (2006.01)
*F16H 47/04* (2006.01)
*B60K 6/12* (2006.01)
*B60K 6/36* (2007.10)
*B60K 25/06* (2006.01)
*E01C 23/12* (2006.01)
*F16H 37/08* (2006.01)

(52) U.S. Cl.
CPC ............ *B60K 25/06* (2013.01); *E01C 23/127* (2013.01); *F16H 47/04* (2013.01); *B60K 2025/022* (2013.01); *B60K 2025/026* (2013.01); *B60Y 2200/41* (2013.01); *F16H 2037/088* (2013.01); *F16H 2200/2005* (2013.01); *Y10S 903/915* (2013.01)

(56) References Cited

U.S. PATENT DOCUMENTS

| | | |
|---|---|---|
| 2004/0204276 A1 | 10/2004 | Tarasinski |
| 2008/0085802 A1 | 4/2008 | Rauschenbach et al. |
| 2008/0103006 A1* | 5/2008 | Pollman ................. F16H 47/04 475/72 |
| 2008/0173740 A1* | 7/2008 | Parker ................... E01C 23/088 241/33 |
| 2008/0260461 A1* | 10/2008 | Berning ................ E01C 23/088 404/112 |
| 2010/0210389 A1* | 8/2010 | Legner ................... F16H 47/04 475/72 |

FOREIGN PATENT DOCUMENTS

| | | |
|---|---|---|
| EP | 0 911 546 B1 | 6/2003 |
| WO | 2008/089428 A1 | 7/2008 |

OTHER PUBLICATIONS

Espacenet, English Machine Translation of German Application No. DE102009051478A1, published May 5, 2011, retrieved from http://worldwide.espacenet.com on Sep. 10, 2014 (8 pages).
German Patent Office, German Search Report, Application No. DE 10 2012 006 189.7, dated Nov. 21, 2012 (4 pages).
European Patent Office, International Search Report, International Application No, PCT/EP2013/000686, dated Jun. 5, 2013 (3 pages).
European Patent Office, English Translation of International Search Report, International Application No. PCT/EP2013/000686, dated Jun. 5, 2013 (2 pages).
The International Bureau of WIPO, English Translation of International Preliminary Report on Patentability and Written Opinion of the International Searching Authority, International Application No. PCT/EP2013/000686, date of issuance Oct. 1, 2014 (9 pages).

\* cited by examiner

DRIVING DEVICE IN A SELF-PROPELLED CONSTRUCTION MACHINE AND METHOD FOR SETTING A SPEED RATIO IN SUCH A DRIVING DEVICE

CROSS-REFERENCE TO RELATED APPLICATIONS

This application is a submission under 35 U.S.C. § 371 of International Application No. PCT/EP2013/000686, filed Mar. 8, 2013, which claims priority to German Application No. 10 2012 006 189.7, filed Mar. 27, 2012, the disclosures of which are hereby expressly incorporated by reference herein in their entireties.

FIELD OF THE INVENTION

The present invention relates to a driving device in a self-propelled construction machine, more particularly, a construction machine for the treatment of ground surfaces, comprising a first driving unit and a working device wherein a first drive train disposed between the first driving unit and the working device operates at a different speed of rotation. The present invention further relates to a method for effecting a change in the speed of rotation of the working device disposed within the first drive train.

BACKGROUND OF THE INVENTION

Examples of self-propelled construction machines are, in particular, rollers, refuse compactors, road milling machines, recyclers, ground stabilizers, and stationary and mobile crushers. Such construction machines comprise an internal combustion engine as the main drive, powering the traveling drive and the drives for the working device. Working device within the scope of the present invention should be understood to refer, in particular, to a working device having a large mass and, thus, a large inertia, the speed of which can only slowly be increased from the idling speed to the operating speed. Examples thereof are the traveling drives of the self-propelled construction machines and the milling rotors of the aforementioned construction machines. During road milling operations, construction machines comprising milling rotors typically alternate between the operational mode at a slow traveling speed and the maneuvering or transportation mode at an increased traveling speed. During the operational mode, the milling rotor is lowered to a working position and is run at operating speed.

The main drive and the drives of the working device, also referred to as secondary drives, usually operate at different speeds of rotation. When working devices are connected, a defined procedure must therefore be regularly strictly adhered to, during which a predefined speed of rotation of the main drive must first be established before the connection can be made and the force flow restored. In the case of known construction machines, the gear system operates in slip mode during the coupling operation until the first driving unit and the milling rotor rotate at a synchronized speed of rotation. Depending on the difference in speed of rotation and the inertia of the drive train, the slip mode continues for a longer period of time and the wear therefore increases, resulting in a shortening of the lifespan of the components. Due to the predominant use of an internal combustion engine as the main drive unit with an output that is highly dependent on the speed of rotation, said engine does not operate within the optimal range due to the alternation between the idling and operating speeds, resulting in increased fuel consumption.

Coupling of the milling rotor is generally not possible while the driving unit is switched off or while it is running at the operating speed. It is instead necessary to reduce the speed of rotation of the driving unit, usually down to the idling speed, for the purpose of making coupling possible. Afterwards, the operating speed must be restored. For the purpose of avoiding the time-consuming coupling process when changing from maneuvering mode to operational mode, the milling rotor is often allowed to continue to run at the same speed of rotation in the maneuvering mode as is used during the operational mode. Due to the fact that the direction of rotation of the wheels or tracks of the construction machine corresponds to that of the milling rotor while reversing, there is a risk of the construction machine accelerating uncontrollably should the milling rotor unintentionally make contact with the ground. Such contact can be extremely hazardous and might also lead to damage to the milling rotor.

In the event of maintenance or installation work being carried out on the milling rotor of a milling machine, for example, when replacing milling chisels, it is necessary to move the milling rotor slowly and gradually at small angular steps or continuously, in order to allow an operator free access to the entire cylinder jacket, even when the milling rotor is fitted inside the milling machine. The first driving unit is not suitable for this purpose when said unit is the main drive. In the prior art, the use of the main drive is also not permitted for this purpose for safety reasons. It must therefore always be switched off. Such tasks are thus carried out using a second driving unit acting as a secondary drive. The known procedure involving the connection of said secondary drive whilst simultaneously switching off the main drive has been found to be relatively complex.

SUMMARY OF THE INVENTION

One aspect of the present invention is therefore to provide a device and method for effecting a change in the speed of rotation of the type described above, by means of which the speed of rotation of the working device can be readily adjusted.

According to one embodiment, there is provided a second drive train comprising a second driving unit between the second driving unit and the working device and in that the two drive trains are connected via a summation transmission.

In one embodiment, a third speed of rotation is generated by the second driving unit and is summate with the first speed of rotation, and that said working device is driven at said third speed of rotation.

The present invention has the advantage of enabling clutch-free starting, accelerating, and decelerating, as well as the operation of the working device at optimum speed of rotation without having to first decelerate the first driving unit from its optimum operating speed. The adjustment of the speed of rotation required to start the working device can be carried out solely by selecting the speed of rotation of the second driving unit. The first driving unit can therefore always operate at an optimum operating speed, thus reducing the energy consumption. The first driving unit is preferably an internal combustion engine that is able to determine, by means of operating characteristics, at which speed of rotation the internal combustion engine must operate in order to deliver a specified output at lowest possible fuel consumption. The summation transmission makes it possible to continuously adjust the desired speed ratio between the first driving unit and the working device in a simple manner.

At the same time, the third speed of rotation can be adjusted to suit the relevant usage of the working device so that the working device can operate as desired. In the case of the aforementioned construction machines, the traveling drive and/or the milling rotor, for example, can operate at a higher or lower second speed of rotation. Furthermore, in the case of milling machines, the milling power can be increased at a reduced traveling speed and the milling rate can be set by selecting the third speed of rotation so as to optimize the ground quality of the ground being processed, for example, during so-called fine milling. During maneuvering and reversing operations, the third speed of rotation can be reduced or even reset to zero while maintaining the operating characteristics of the first driving unit. There is no need for time-consuming coupling operations and speed runs of the first driving unit, so that faster and cheaper processing of a work order is possible as compared with prior art construction machines.

An advantage of the present invention is further achieved for maintenance and installation work by use of a device and a method according to the present invention, in which the first drive train is disconnected and the second drive train is connected to the milling rotor. According to the present invention, connection to the secondary drive formed by the second driving unit can be established particularly easily by means of a summation transmission. A particular advantage is achieved when the secondary drive is used both for maintenance and installation work as well as for the adjustment of the speed of rotation during traveling operation and when connecting the working device. In that case, all of the said functions can be carried out by means of just one second driving unit.

An advantageous further development of the device according to one embodiment of the present invention is characterized by the fact that the gear system comprises a planetary gear with the second driving unit engaging with the planetary gear. Planetary gears make for large scale-up or scale-down ratios in compact constructions. Since the second driving unit engages within the planetary gear, the compact construction form is maintained.

The present invention is further developed according to one embodiment in that the planetary gear comprises a sun wheel, a planetary carrier comprising a number of planetary wheels, and a gear ring, the gear ring being mounted for rotation on a driving shaft, while the planetary carrier is non-rotatably connected to an output shaft, while the second driving unit engages the gear ring. To this end, the gear ring can comprise an outer intermeshing gear system as well as an inner intermeshing gear system which an output shaft of the second driving unit engages by means of an appropriate intermeshing gear system. Due to the gear ring being pivoted on the driving shaft of the gear system, it can rotate without slipping relatively to the first speed of rotation of the first driving unit and relatively to the second speed of rotation of the second driving unit. A torque converter is not required in this case, meaning that the constructive effort of the gear system can be kept to a minimum and the power output of the first driving unit can be better utilized.

In the event of the first driving unit being designed as an internal combustion engine, the engine can operate constantly at an optimum speed of rotation for the purpose of achieving a predetermined power output at minimum fuel consumption. If the first driving unit operates at a mainly constant first speed of rotation in an optimum output range, the third speed of rotation and, thus, the speed of rotation of the working device can be selected fully variably and continuously, solely by controlling or regulating the second driving unit, and, thus, the speed ratio can be adjusted as desired. During the maneuvering phase, the working device can operate at a low third speed of rotation. As there is no interruption in the force flow between the first driving unit and the working device, there is no further requirement for a slip mode for the purpose of coupling the working device, which is concomitant to a reduction in wear on the device components and an increase in their lifespan as compared with prior art devices.

A further development of the present invention is characterized in that the planetary gear comprises a sun wheel, a planetary carrier comprising a number of planetary wheels, and a gear ring, in which the planetary carrier is mounted for rotation on a driving shaft and the gear ring is non-rotatably connected to an output shaft and that the second driving unit engages the planetary carrier. To this end, the planetary carrier can comprise an outer intermeshing gear system as well as an inner intermeshing gear system that is engaged by an output shaft of the second driving unit by means of an appropriate intermeshing gear system. Due to the fact that the planetary carrier is mounted for rotation on the driving shaft of the gear system, it can rotate without slipping depending on the first speed of rotation of the first driving unit and on the second speed of rotation of the second driving unit. Here again, there is no need for a torque converter. If the first driving unit operates at a mainly constant first speed of rotation in an optimum output range, the third speed of rotation and, thus, the speed of rotation of the working device can be selected fully variably and continuously, solely by controlling or regulating the second driving unit.

The second driving unit is preferably designed in the form of a hydraulic engine. When used in construction machines, a hydraulic supply is usually provided and, thus, no additional measures are required to operate the hydraulic engine.

According to a further embodiment, the hydraulic engine can operate by means of a hydraulic pump powered by the first driving unit, preferably by means of a transfer gear. In this embodiment, the hydraulic engine is powered indirectly by means of the first driving unit so that there is no need for a separate drive assembly for the hydraulic engine.

It is further advantageous when the second driving unit is directly powered by the first driving unit. This also makes for a reduction of the constructive effort for the provision of the second driving unit, as there is again no need for additional drive assemblies for the second driving unit of this embodiment.

The device according to one embodiment of the present invention is further developed in that the second driving unit is designed as an electric motor. Electric motors are characterized by their compact design and provide an output which is largely independent of the speed of rotation. Furthermore, such motors can be easily controlled by means of an electronic control device and integrated in an existing control circuit or regulating circuit of a construction machine.

The first driving unit preferably drives a generator supplying the electric motor. There is therefore no need for a separate energy supply for the electric motor, with the result that there is a constant, sufficient supply of energy to the second driving unit as long as the first driving unit is in operation.

An advantageous embodiment of the present invention is characterized in that the first driving unit co-operates with a storage device for the purpose of storing energy. The storage device can take the form of an accumulator for storing electrical energy when the first driving unit powers a generator. Alternatively or additionally, the storage device may be in the form of a flywheel that directly stores the kinetic energy or, more particularly, the rotational energy of the first driving unit. If the second driving unit is at a standstill, the energy emitted by the first driving unit can be stored by the storage device also powering the second driving unit if so required. The first driving unit can thus be of smaller dimensions, resulting in reduced fuel consumption ("downsizing").

The second driving unit preferably comprises a CVT transmission which can be driven by the first driving unit. This also indirectly powers the second driving unit via the first driving unit, wherein the CVT transmission offers the advantage of a continuous gear ratio with the result that the second speed of rotation can also be adjusted continuously by mechanical means.

The working device is preferably designed in the form of a milling rotor of a construction machine adapted for treatment of ground surfaces. Milling rotors of construction machines usually have a large mass and, thus, large inertia, meaning that the device according to the present invention can be used to particular advantage in the case of construction machines. The reduction in fuel consumption as well as the continuous adjustability of the second speed of rotation at which the milling rotor is driven result in more economical, faster, and safer milling of road surfaces compared with prior art construction machines.

An advantage of the present invention is also achieved by means of a construction machine for processing ground surfaces comprising a device of one of the exemplary embodiments described above. The advantages and technical effects resulting herefrom correspond to those described above with reference to the device according to exemplary embodiments of the present invention.

BRIEF DESCRIPTION OF THE DRAWINGS

The present invention is explained in detail below with reference to preferred exemplary embodiments shown in the figures, in which.

Like parts are identified in the figures by the same reference numerals.

DETAILED DESCRIPTION OF THE INVENTION

Figure 1:
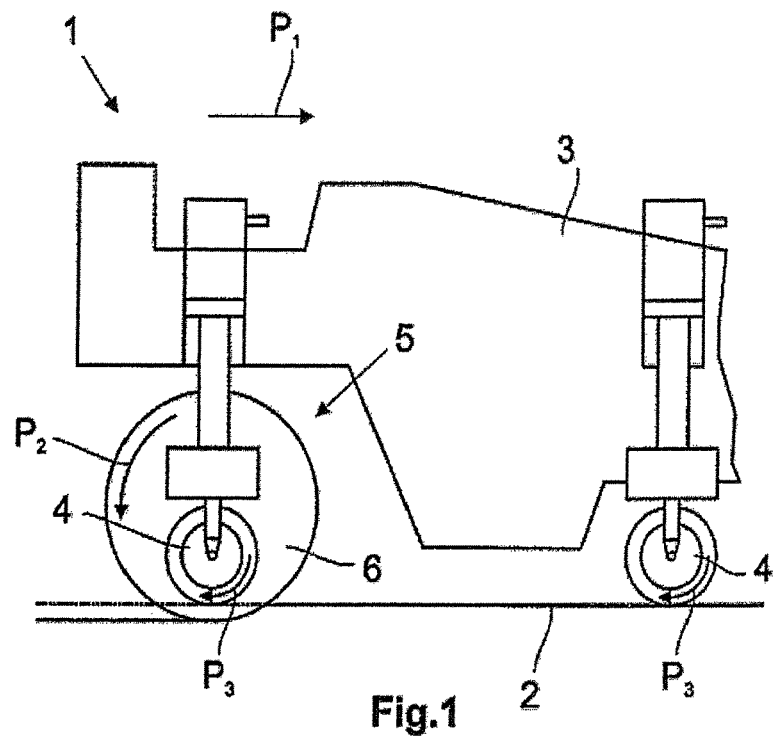
FIG. 1 is a self-propelled construction machine for processing the ground.

FIG. 1 illustrates a construction machine 1 in the form of a road milling machine comprising a machine frame 3 and wheels 4 adapted to process a traffic area 2. In the example shown, it comprises a working device 5 designed as a milling rotor 6. In the view shown in FIG. 1, the milling rotor 6 is in a descended working position. The direction of travel during the milling operation is identified by the arrow $P_1$. In this case the direction of rotation of the milling rotor 6 indicated by the arrow $P_2$ is contrary to the direction of rotation of the wheels 4 denoted by the arrow $P_3$.

Figure 2:
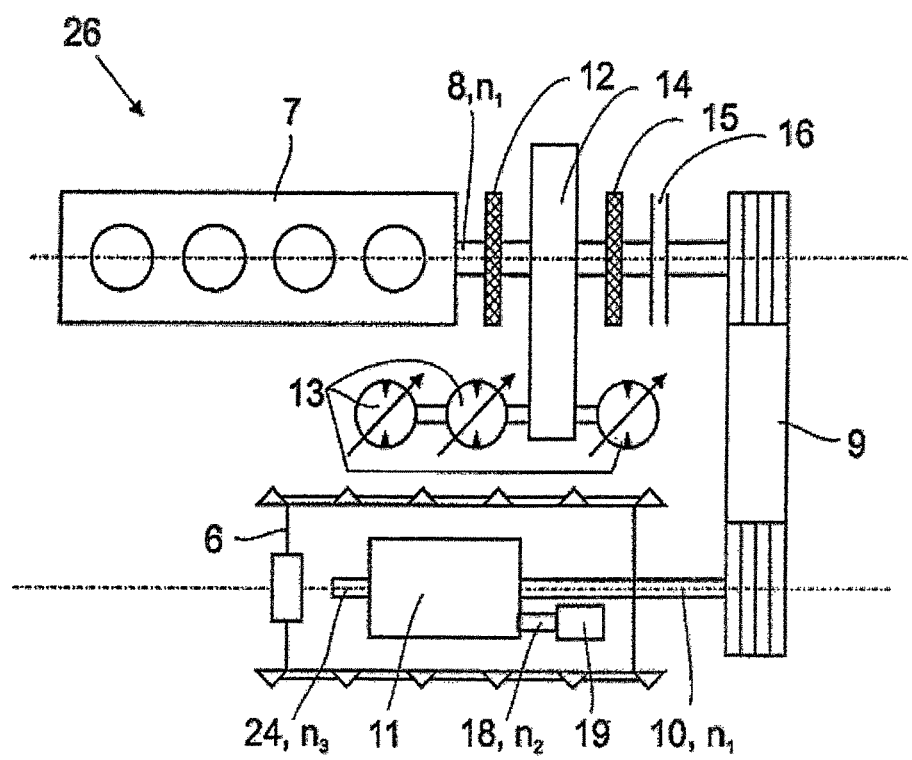
FIG. 2 is a detailed view of the device according to the present invention built into the construction machine shown in FIG. 1.

According to FIG. 2, the construction machine 1 comprises a driving device 26 for the milling rotor 6. It comprises a first driving unit 7 driving a belt transmission 9 at a first speed of rotation $n_1$ via an output shaft 8. In this case, the first driving unit 7 is the powerful main drive of the construction machine 1 and is designed as an internal combustion engine. A decoupling unit 12, a transfer gear 14, a resilient coupling 15, and a switchable clutch 16 are disposed on the output shaft 8 in that order between the first driving unit 7 and the belt transmission 9. In addition to the milling rotor 6, a number of other working devices (not shown) or implements of the construction machine 1 can be driven by the transfer gear 14, in this case designed as hydraulic variable displacement pumps 13.

The belt transmission 9 drives a first driving shaft 10 for a gear 11 of the milling rotor 6 disposed within the milling rotor 6. In the example shown, the output shaft 8 and the first driving shaft 10 run at the same first speed of rotation $n_1$. The gear 11 is designed as a triple-shaft transmission comprising a second driving shaft 18 driven by a second driving unit 19 in the milling rotor 6 at a second speed of rotation $n_2$. The second driving unit 19 is designed as a secondary drive having a lower power output than the first driving unit 7. The gear 11 drives the milling rotor by means of an output shaft 24 at a third speed of rotation $n_3$.

Starting from the first and the second driving unit 7, 19 respectively, two drive trains are formed leading to the output shaft 24. The gear 11 is a summation transmission connecting the two drive trains to the output shaft 24 and guiding these towards the milling rotor 6. The third speed of rotation $n_3$ can be altered by changing the first and/or the second speed of rotation $n_2$ by way of the summation transmission. The third speed of rotation $n_3$, in particular, can be altered by changing the second speed of rotation $n_2$ independently of the first speed of rotation $n_1$.

Figure 3:
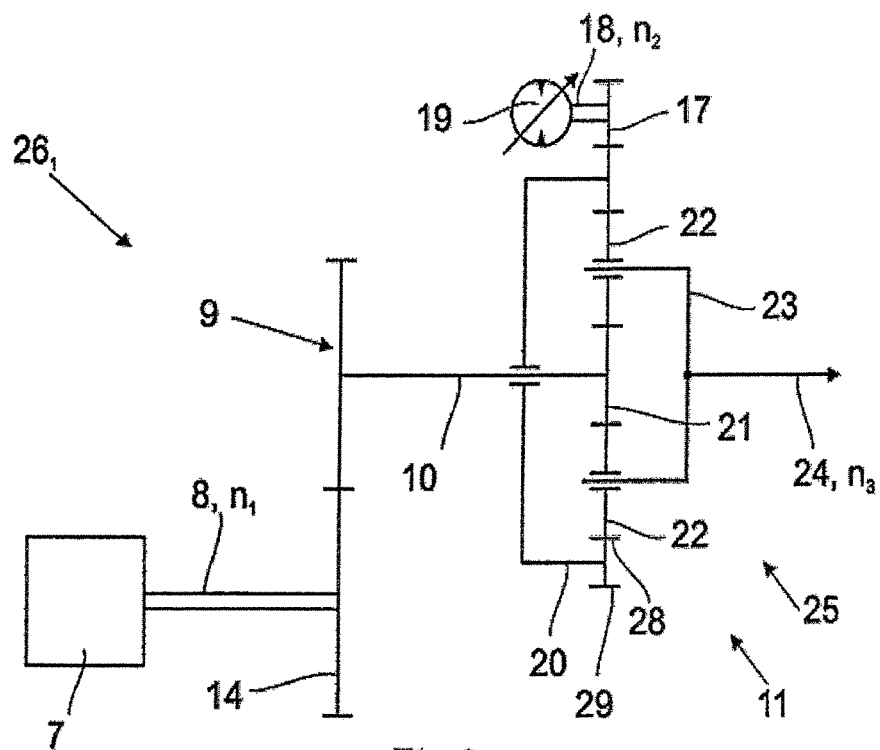
FIG. 3 to FIG. 15 each show an exemplary embodiment of the device according to the present invention.

FIG. 3 shows a first exemplary embodiment of the driving device $26_1$, in which the above described components between the first driving unit 7 and the belt transmission 9 are not shown for the sake of simplification. The belt transmission 9 is depicted by a cogwheel symbol and the transfer gear is depicted by a cogwheel 14. The gear 11 comprises a planetary gear 25 comprising a sun wheel 21, planetary wheels 22, and a first gear ring 20.

The second driving unit 19 is connected via the second driving shaft 18 to a cogwheel 17 engaging the planetary gear 25. In this first example, the second driving unit 19 is designed as a controllable hydraulic engine.

Via the transfer gear 14 and the belt transmission 9, the first driving unit 7 drives the driving shaft 10 comprising the sun wheel 21 at the first speed of rotation $n_1$. Said sun wheel engages the planetary wheels 22 mounted for rotation on a planetary carrier 23. The planetary carrier 23 is non-rotatably connected to the output shaft 24 driving the milling rotor 6 (see FIGS. 1 and 2) at the third speed of rotation $n_3$. The first gear ring 20 is mounted for rotation on the driving shaft 10 and comprises an inner intermeshing gear system 28 and an outer intermeshing gear system 29. The first gear ring 20 engages the planetary wheels 22 via the inner intermeshing gear system 28 whilst the second driving unit 19 engages the outer intermeshing gear system 29 of the first gear ring 20 by means of the cogwheel 17 at the second speed of rotation $n_2$.

The first drive train comprises the first driving unit 7, the transfer gear 14, the belt transmission 9, the sun wheel 21, the planetary wheels 22, and the planetary carrier 23. The second drive train comprises the second driving unit 19, the cogwheel 17, the first gear ring 20, the planetary wheels 22, and the planetary carrier 23.

During operation, the first driving unit 7 drives the driving shaft 10 at the first speed of rotation $n_1$, at which the sun wheel 21 also rotates. When the second driving unit 19 is at a standstill, the first gear ring 20 is also at a standstill, so that the planetary wheels 22 roll on the inner intermeshing gear system 28 of the first gear ring 20 and cause the planetary carrier 23 to rotate at the third speed of rotation $n_3$ at a fixed ratio relative to the first speed of rotation $n_1$, as determined by the gear ratios of the gear 11.

In the event of the second driving unit 19 being operated at a second speed of rotation $n_2 \neq 0$, the first gear ring 20 will rotate about the driving shaft 10. Accordingly, the planetary wheels 22 run at a different relative speed on the first gear ring 20 compared with the first gear ring 20 being at a standstill, resulting in a change in the third speed of rotation $n_3$ of the output shaft 24. The third speed of rotation $n_3$ may be increased or reduced depending on the direction of rotation and the second speed of rotation $n_2$ of the second driving unit 19. In this way it is even possible to reduce the third speed of rotation $n_3$ to zero. In addition, the direction of rotation of the output shaft 24 can also be altered by way of the second driving unit 19.

When the first driving unit 7 is at a standstill, the second driving unit 19 determines the third speed of rotation $n_3$.

The second speed of rotation $n_2$ of the second driving unit 19 can be controlled by a control device according to fixed algorithms, wherein a variety of programs can be provided for the various materials of the road surface 12 or for achieving the desired surface condition. Alternatively or additionally, the second speed of rotation $n_2$ of the second driving unit 19 may also be regulated to suit various aims. In this case, the third speed of rotation $n_3$ is registered by means of a sensor (not shown) and compared with a setpoint value. If necessary, the second speed of rotation $n_2$ of the second driving unit 19 may be altered for the purpose of setting the setpoint value. In this way, it is possible to balance out any fluctuations in the first speed of rotation $n_1$, or in the third speed of rotation $n_3$.

In the event of the second driving unit being used to start the milling rotor 6 and/or to support the milling operation, the performance ratio between the first driving unit 7 and the second driving unit 19 ($P_{A1}/P_{A2}$) is typically 10 or more. For example, $P_{A1}$ can thus be 500 to 240 kW, the first speed of rotation $n_1$ being, for example, 1800 $min^{-1}$ and the third speed of rotation $n_3$ 300 $min^{-1}$.

For the purpose of effecting installation and maintenance work on the milling rotor 6, the first driving unit 7 will be disconnected and the milling rotor 6 moved solely by means of the second driving unit 19. To this end, the second driving unit 7 must be designed such that the third speed of rotation $n_3$ can be adjusted to such a low setting that the milling rotor 6 can be moved slowly without risk to an operator and stopped at short angular intervals.

Figure 4:
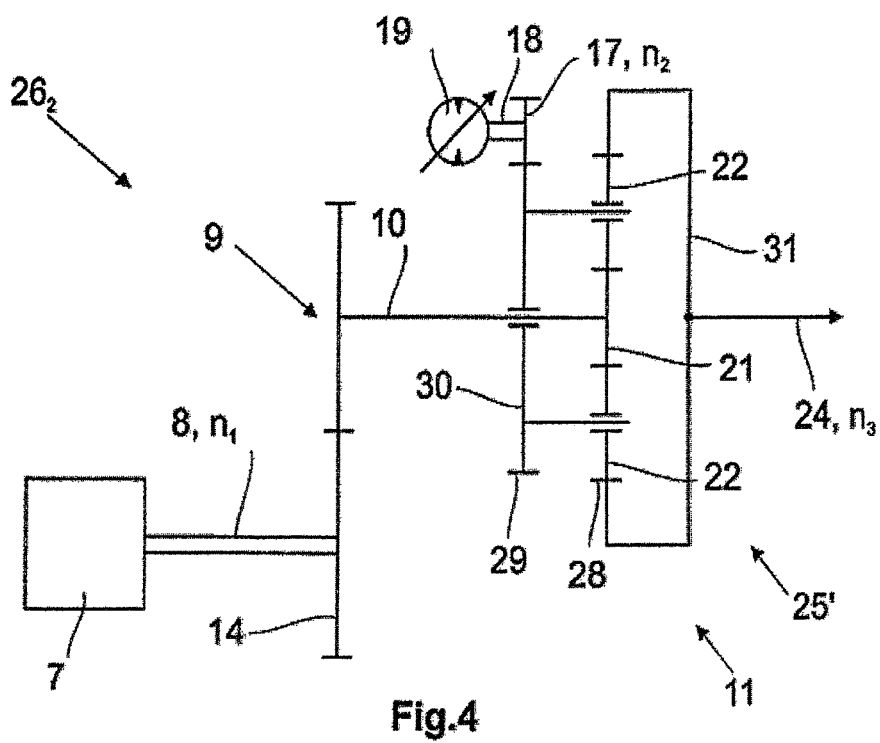

FIG. 4 shows a second exemplary embodiment of the driving device $26_2$. This comprises a planetary gear 25' comprising the sun wheel 21, the planetary wheels 22, and a second gear ring 31. Unlike the first exemplary embodiment, a second planetary carrier 30 is mounted for rotation on the driving shaft 10 in the second exemplary embodiment, and the second gear ring 31 is non-rotatably connected to the output shaft 24. The second gear ring 31 comprises an inner intermeshing gear system 28 engaging the planetary wheels 22. The second driving unit 19 engages the second planetary carrier 30, which comprises an outer intermeshing gear system 29 for this purpose, by means of the cogwheel 17.

In the present example, the first drive train comprises the first driving unit 7, the belt transmission 9, the sun wheel 21, the planetary wheels 22, and the second gear ring 31. The second drive train comprises the second driving unit 19, the cogwheel 17, the second planetary carrier 30, the planetary wheels 22, and the second gear ring 31.

The exemplary embodiments shown in FIG. 5, FIG. 6, FIG. 7, and FIG. 8 each further illustrate examples for the propulsion of the second driving unit 19. In all other respects, the first and second drive trains each correspond to the drive trains of the first example illustrated in FIG. 3.

Figure 5:
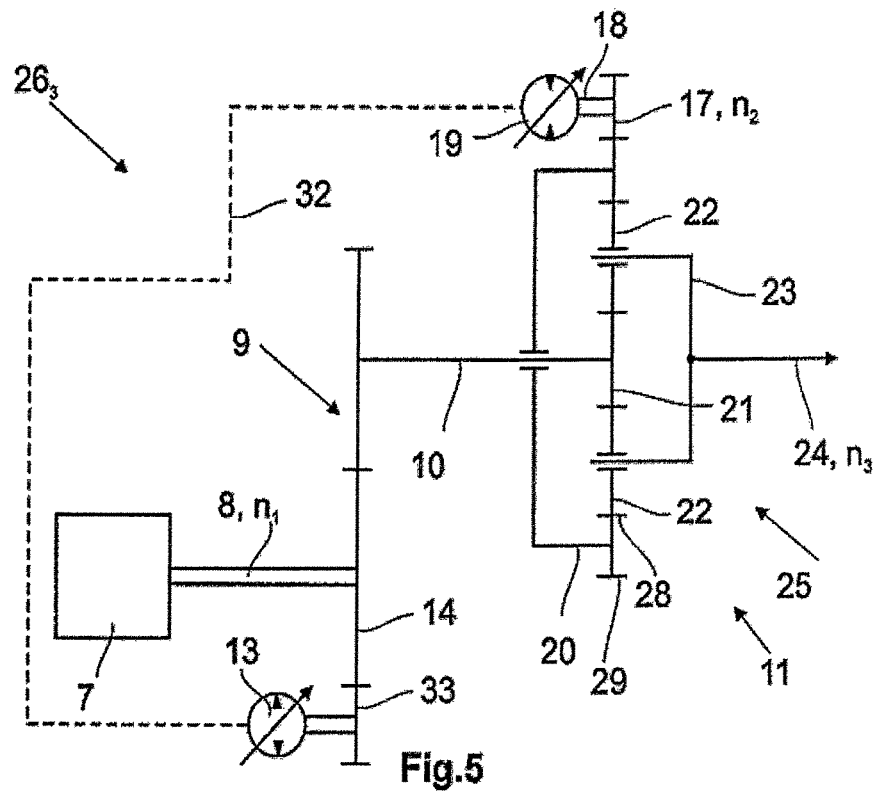

FIG. 5 shows a third exemplary embodiment of the driving device $26_3$ wherein the second driving unit 19 designed as a hydraulic engine is supplied by one of the hydraulic pumps 13 via a hydraulic line 32. It is driven by a cogwheel 33 by way of the transfer gear 14. The first driving unit 7 thus also indirectly drives the second driving unit 19.

The input shaft 10 is designed as a hollow shaft in order that the hydraulic line 32 can be guided into the milling rotor.

Figure 6:
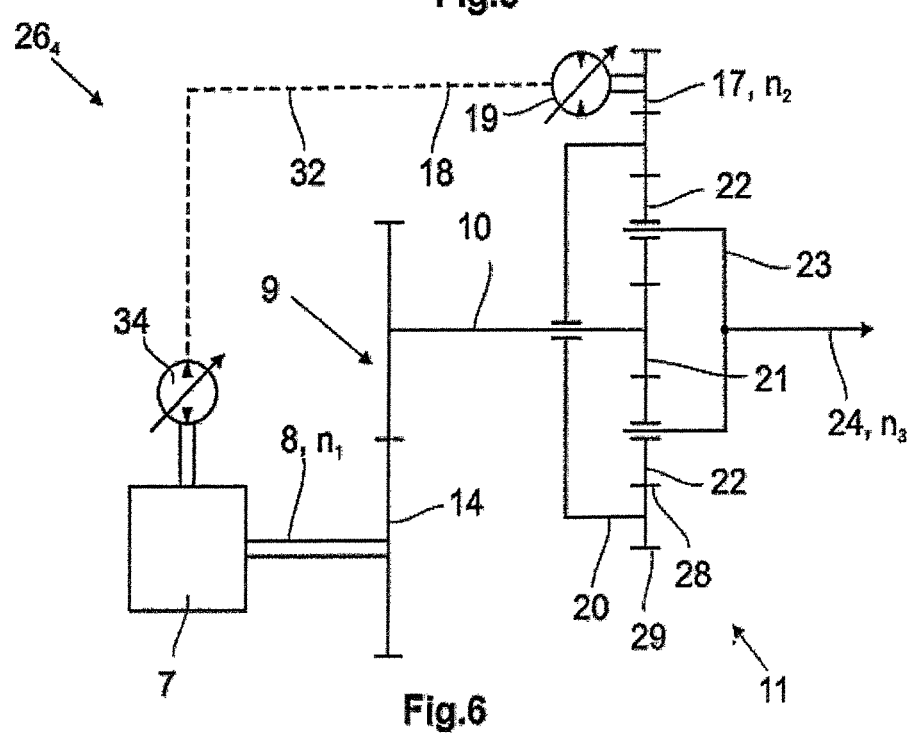

In the fourth exemplary embodiment of the driving device $26_4$ shown in FIG. 6, the first driving unit 7 directly drives a hydraulic pump 34 supplying the second driving unit 19, designed as a hydraulic engine, by way of the hydraulic line 32.

Figure 7:
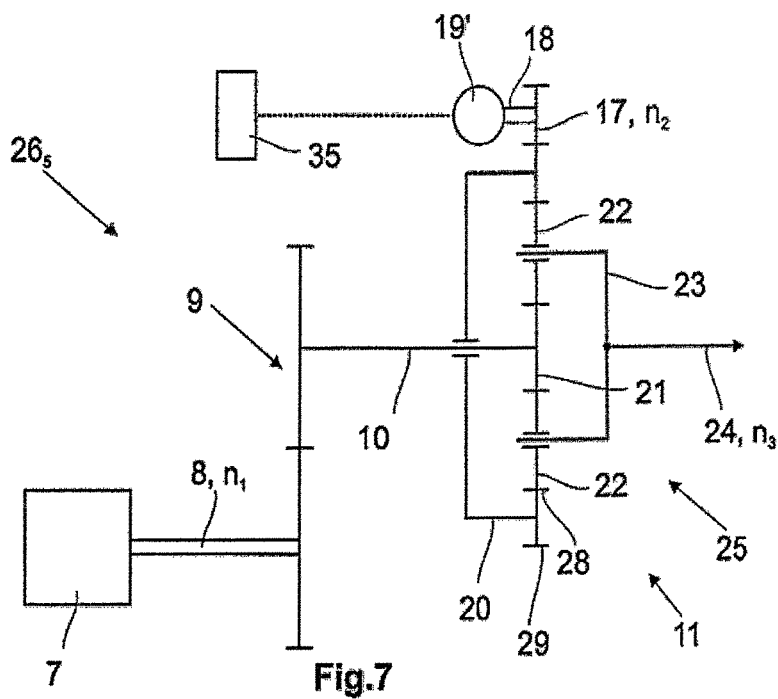

FIG. 7 shows a fifth exemplary embodiment of the driving device $26_5$ that differs from the first exemplary embodiment shown in FIG. 3 in that the second driving unit 19' is designed as an electric motor. A control unit 35 serves to control the speed of rotation and the power output.

Figure 8:
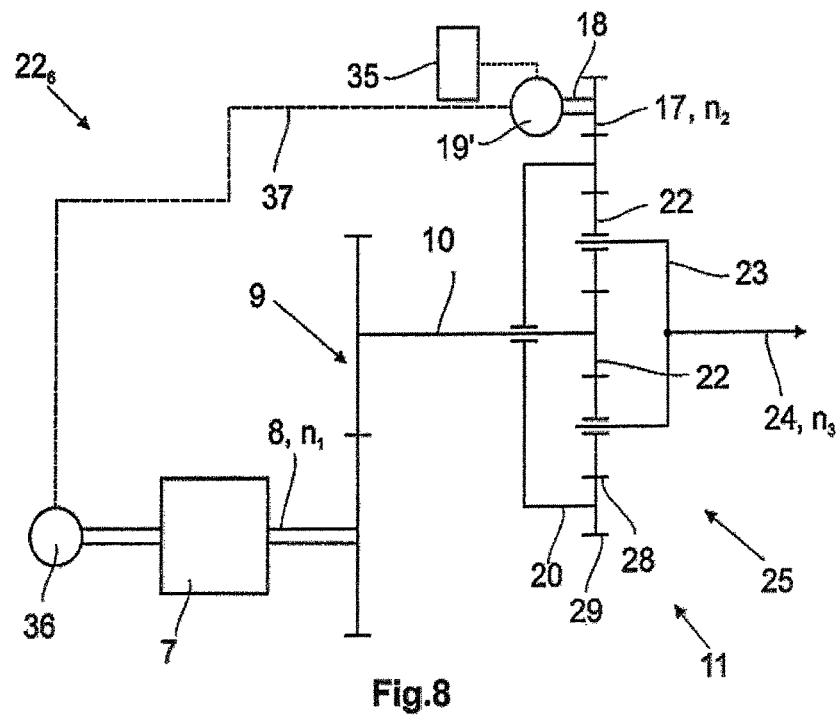

FIG. 8 shows a sixth exemplary embodiment of the driving device $26_6$, comprising a generator 36 in addition to the arrangement of the fifth exemplary embodiment as shown in FIG. 7. This serves to supply the second driving unit 19' designed as an electric motor and is directly driven by the first driving unit 7. The electric motor and the generator 36 are interconnected via an electric line 37. The generator 36 can be designed as a flywheel generator. In this case, the flywheel serves to store the kinetic energy provided by the first driving unit 7.

The input shaft 10 is designed as a hollow shaft for the purpose of guiding the electric conductor 37 into the milling rotor.

Figure 9:
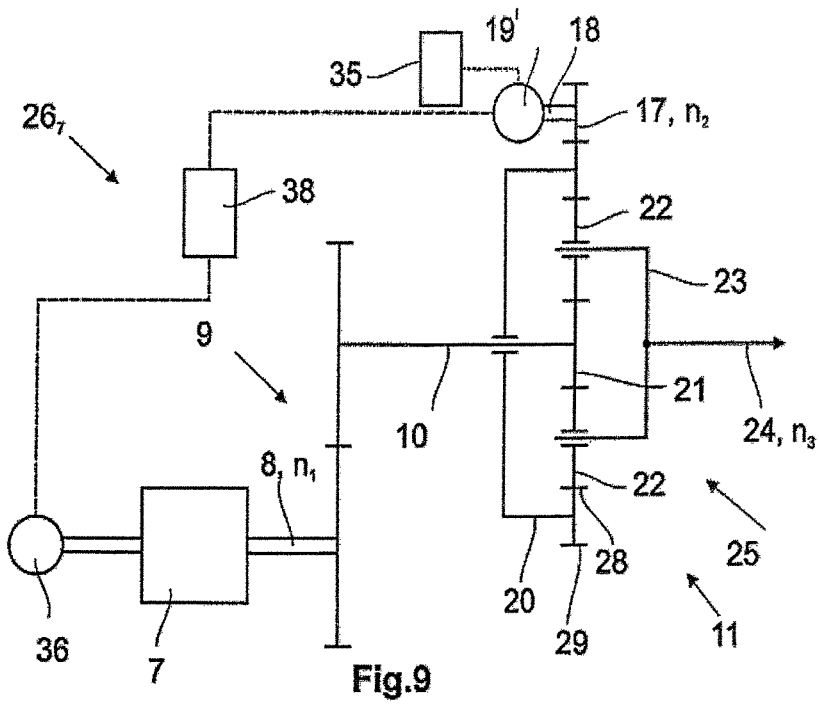

FIG. 9 shows a seventh exemplary embodiment of the driving device $26_7$, which differs from the sixth exemplary embodiment shown in FIG. 8 in that an accumulator 38 is provided between the second driving unit 19' designed as an electric motor and the generator 36 for the purpose of storing the electric energy generated by the generator 36. In this variant too, the generator 36 may be designed as a flywheel generator.

Figure 10:
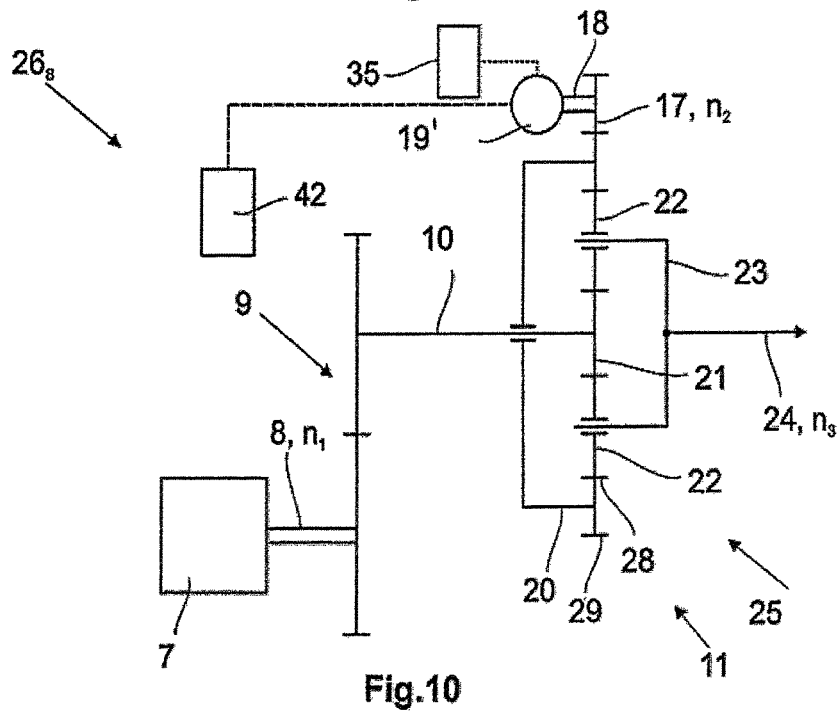

In the eighth exemplary embodiment of the driving device $26_8$ shown in FIG. 10, the second driving unit 19' designed as an electric motor is supplied solely by a separate energy source 42, more particularly, by an accumulator. In other respects, the driving device $26_8$ is equivalent to the seventh exemplary embodiment shown in FIG. 9.

Figure 11:
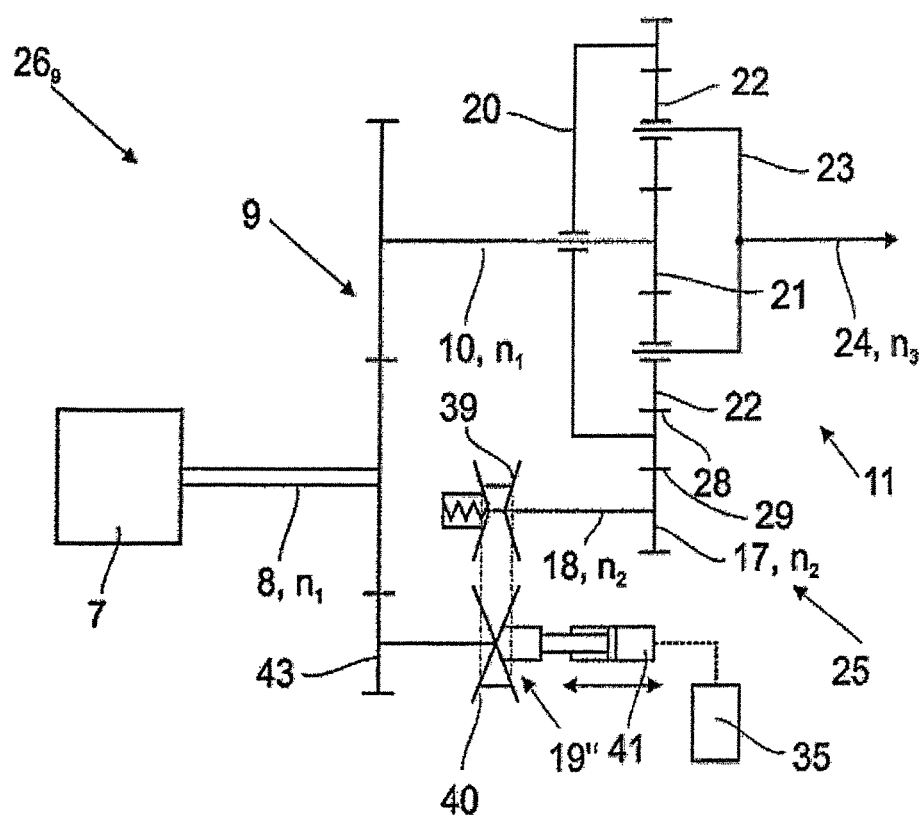

FIG. 11 shows a ninth exemplary embodiment of the driving device $26_9$ in which the second driving unit 19" is designed as a continuous gear (CVT transmission). The pair of bevel disks 39 on the output side of the CVT transmission drives the second driving shaft 18 of the second drive train. In other respects, the first and second drive trains are equivalent to the first exemplary embodiment shown in FIG. 3. The pair of bevel disks 40 on the input side of the CVT transmission is connected to the output shaft 8 of the first driving unit 7 via the transfer gear 14 and a cogwheel 43. The gear ratio of the CVT transmission is set by means of an adjustable hydraulic unit 41 controlled by an adjusting or regulating device 42.

Figure 12:
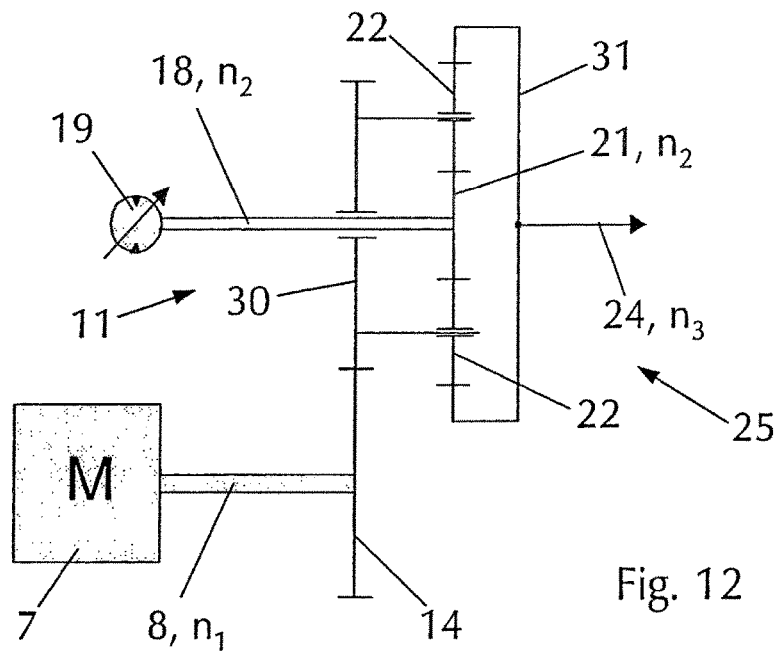

The tenth exemplary embodiment shown in FIG. 12 comprises a planetary gear comprising a sun wheel 21, two planetary wheels 22, and a second gear ring 31 with the output shaft 24. A second planetary carrier 30 is driven by the transfer gear depicted as a cogwheel 14. The second planetary carrier is mounted for rotation on the second driving shaft 18, which, coming from the second driving unit 19, drives the sun wheel 21.

Figure 13:
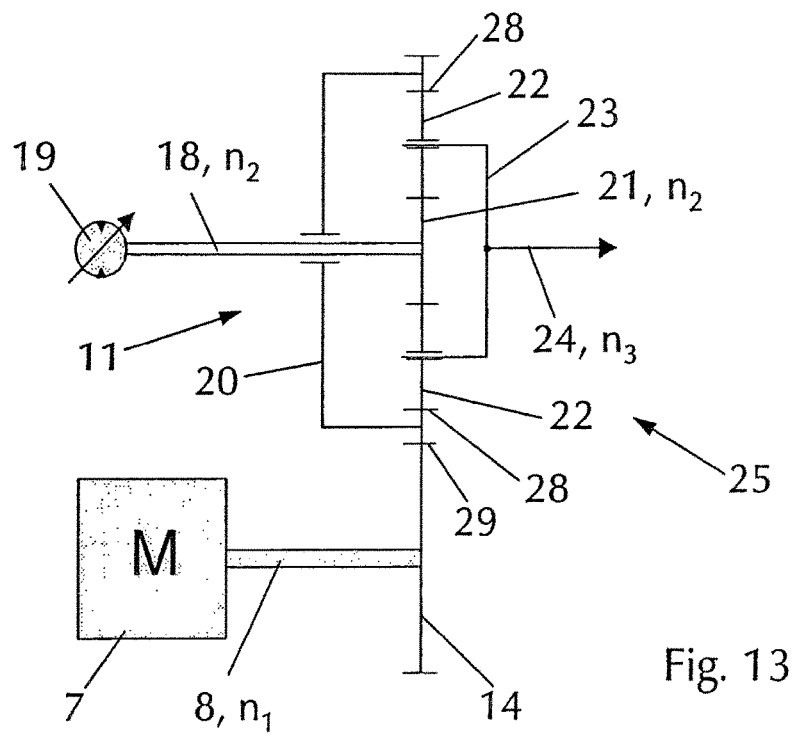

An eleventh exemplary embodiment shown in FIG. 13 comprises a planetary gear 25 comprising a sun wheel 21, and a planetary carrier 23 on the output side comprising two planetary wheels 22. The shaft of the planetary carrier 23 forms the output shaft 24. A first gear ring 20 meshes with the two planetary wheels 22 by way of its inner intermeshing gear system 28. The first gear ring is driven by the cogwheel 14 via its outer intermeshing gear system 29. The first gear ring 20 is mounted for rotation on the second driving shaft 18, which, coming from the second driving unit 19, drives the sun wheel 21.

Figure 14:
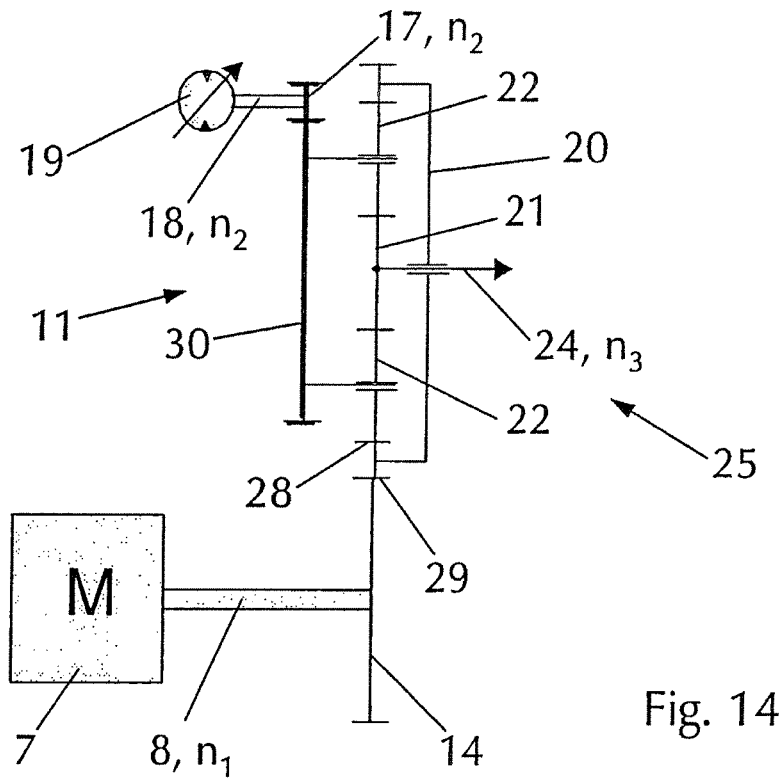

The twelfth exemplary embodiment shown in FIG. 14 comprises a planetary gear 25 comprising a sun wheel 21, two planetary wheels 22, and a planetary carrier 30. The shaft of the sun wheel 21 forms the output shaft 24. A first gear ring 20 is mounted for rotation on the output shaft 24, its inner intermeshing gear system 28 meshing with the planetary wheels 22. This is driven by the cogwheel 14 by means of its outer intermeshing gear system 29. A cogwheel 17 engaging the second planetary carrier is non-rotatably mounted on the second driving shaft 18.

Figure 15:
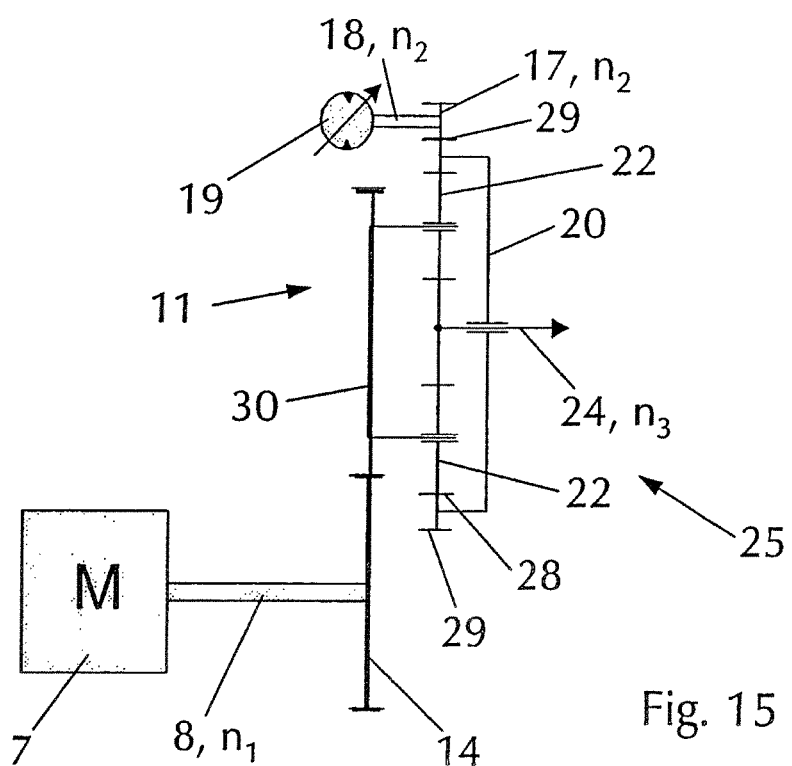

The thirteenth exemplary embodiment shown in FIG. 15 differs from the twelfth exemplary embodiment shown in FIG. 14 in that the cogwheel 17 located on the second driving shaft 18 meshes with the outer intermeshing gear system 29 of the first gear ring and in that the first driving unit 7 drives the second planetary carrier 30 by way of the cogwheel 14.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A construction machine for processing ground surfaces comprising a milling rotor, wherein the construction machine comprises an internal combustion engine, and wherein a first drive train (A) is formed from said internal combustion engine to a summating transmission driving said milling rotor, said summating transmission being designed as a planetary gear comprising a sun wheel, and wherein said internal combustion engine generates a first speed of rotation ($n_1$), and said milling rotor operates at a third speed of rotation ($n_3$), and wherein a second drive train (B) is formed from a hydraulic engine or electric motor to said summating transmission driving said milling rotor via an output shaft of said summating transmission, with said hydraulic engine or electric motor having a power output that is lower than a power output of said internal combustion engine and said second drive train (B) being coupled to said sun wheel of said planetary gear, and that said first and second drive trains (A, B) are interconnected by the summating transmission to said output shaft of said summating transmission, and wherein the third speed of rotation ($n_3$) is altered by changing the first speed of rotation ($n_1$) and/or the second speed of rotation ($n_2$) via the summating transmission.

2. The construction machine according to claim 1, wherein said planetary gear comprises a sun wheel, a planetary carrier incorporating a plurality of planetary wheels and a gear ring, wherein said gear ring is mounted for rotation on a driving shaft and said planetary carrier is rigidly connected to an output shaft and said hydraulic engine or electric motor engages said gear ring.

3. The construction machine according to claim 1, wherein said planetary gear comprises a sun wheel, a planetary carrier incorporating a plurality of planetary wheels, and a gear ring, wherein said planetary carrier is mounted for rotation on a driving shaft and said gear ring is rigidly connected to an output shaft and said hydraulic engine or electric motor engages said planetary carrier.

4. The construction machine according to claim 1, wherein said hydraulic engine is driven by said internal combustion engine.

5. The construction machine according to claim 1, wherein said internal combustion engine cooperates with an accumulator for storing electrical energy emitted by the internal combustion engine.

6. The construction machine according to claim 1, wherein said milling rotor is designed for processing ground surfaces.

7. A method for effecting a change in the speed of rotation of a milling rotor located in a first drive train of a self-propelled construction machine, wherein an internal combustion engine generates a first speed of rotation ($n_1$), and wherein a second speed of rotation ($n_2$) generated by a CVT transmission is summated at a summating transmission designed as a planetary gear comprising a sun wheel with said first speed of rotation ($n_1$) to create a third speed of rotation ($n_3$) at an output shaft of said summating transmission, with the CVT transmission being adapted to be driven by the internal combustion engine, wherein the third speed of rotation ($n_3$) is altered by changing the first speed of rotation ($n_1$) and/or the second speed of rotation ($n_2$) via the summating transmission.

8. The method according to claim 7, wherein said first speed of rotation ($n_1$) is kept constant and said second speed of rotation ($n_2$) is varied.

* * * * *